United States Patent [19]

Carroll et al.

[11] 3,785,061
[45] Jan. 15, 1974

[54] MAGNETIC COMPASS OR LIKE INDICATING INSTRUMENT

[75] Inventors: Douglas V. Carroll, Ottawa, Ontario; Ramsis I. Attia, Winipeg, Manitoba, both of Canada

[73] Assignee: FMC (Canada) Limited, Ottawa, Ontario, Canada

[22] Filed: Mar. 10, 1971

[21] Appl. No.: 122,684

Related U.S. Application Data

[63] Continuation-in-part of Ser. No. 827,376, May 23, 1969.

[52] U.S. Cl. .................................... 33/364, 33/378
[51] Int. Cl. ........................................... G01c 17/08
[58] Field of Search .............. 33/223, 206 CB, 364

[56] References Cited
UNITED STATES PATENTS 3,023,512   3/1962   Morris et al. ...................... 33/223 X
3,011,264  12/1961   Parera ................................. 33/223
2,098,241  11/1937   Hegenberger et al. ............. 33/223
3,128,562   4/1964   Yusa .................................... 33/223
3,373,498   3/1968   Chabbert ..................... 33/206 CB X

FOREIGN PATENTS OR APPLICATIONS 300,518   9/1917   Germany ............................. 33/223
843,664   6/1970   Canada ................................ 33/223

Primary Examiner—Robert B. Hull
Attorney—Peter Kirby, Charles P. Curphey and Norris M. Eades

[57] ABSTRACT

An inner indicating member immersed in a liquid can turn with three axes of rotational freedom in a spherical housing. A body of mercury at the bottom of the housing forms a captive pool in a recess of the member for holding the same erect in the housing.

7 Claims, 2 Drawing Figures

PATENTED JAN 15 1974 3,785,061

MAGNETIC COMPASS OR LIKE INDICATING INSTRUMENT

This application is a continuation-in-part of Ser. No. 827,376 filed May 23, 1969.

This invention relates to improvements in instrument mountings of the type in which an inner, indicating member, often spherical or part-spherical in shape, is mounted to turn in a generally complementary spherical cavity defined by an outer housing. A liquid occupies the space between the inner member and the housing, in order at least partially to support the member buoyantly therein, as well as to lubricate its rotational movements. The inner member will be so mounted as to have three axes of freedom of rotational movement (i.e. freedom to rotate about three mutually perpendicular axes), subject however to some means for normally maintaining the member in an erect attitude.

One form of instrument for which this type of mounting is suitable is a magnetic compass, especially a compass that is to be used at a location in which the supporting structure is often subject to tilting, e.g. a ship or aircraft. In such an application, there is not only a need for the inner member to be free to turn about a vertical axis to align a magnet bar with the earth's magnetic field, but it is also necessary to keep the inner member erect, i.e. to maintain its normally vertical axis in an at least approximately vertical orientation even when the housing is tilted. This function of keeping a compass rose erect has traditionally been served by such devices as gimbal rings, or by other multiply pivotable support arrangements.

Another approach to this problem is embodied in the compass disclosed in U.S. Pat. No. 3,373,498 issued Mar. 19, 1968 to H.J. Chabbert, where the inner and outer elements are essentially spherical and are mounted to turn one within the other with 3 complete degrees of rotational freedom, except that the inner member is held erect in the outer housing by means of a ball which rolls on the bottom inner surface of the housing while being held captive in a recess in the inner member.

Theoretically, this type of construction should exhibit low turning friction, which is a highly desirable object, if accuracy is to be obtained, especially in small instruments where the magnetic forces involved are not great. However, it has been found in practice that, in all known forms of such instrument mountings, including the Chabbert proposal, relatively close manufacturing tolerances have to be observed, if such low friction is in fact to be realized.

The principal object of the present invention is to provide an improved form of such an instrument mounting, in which the frictional forces inhibiting relative rotation of the parts are still further reduced for a given level of manufacturing tolerances, or conversely, in which the tolerance requirements can be less strict for a given, acceptable amount of frictional turning resistance.

While a magnetic compass is the form of indicating instrument with which the invention has been illustrated and described below, it is to be understood that the invention in its broad scope includes other indicating instruments in which an inner member is immersed in a liquid contained in an essentially spherical cavity in a housing, such member having three axes of rotational freedom within such cavity inhibited only by some means for maintaining the inner member erect.

The accompanying drawings show two embodiments of a compass, provided by way of example and not by way of limitation of the present invention.

Figure 1:
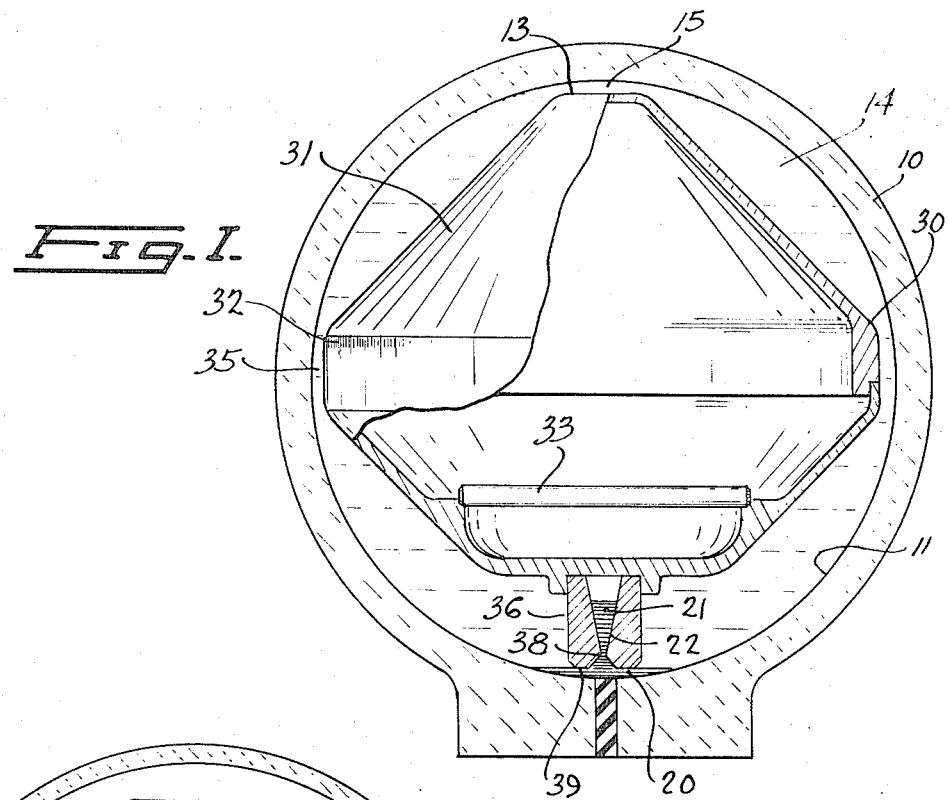
FIG. 1 is a side, cut-away view of a first embodiment.

In the example shown in FIG. 1, a housing 10 defines a spherical cavity having an inner surface 11. The inner, indicating member 30 is hollow and has suitable surfaces such as a conical upper surface 31 or a cylindrical edge surface 32 inscribed with typical compass markings. The edge surface 32 engages the inner surface 11, but with a comparatively large clearance 35. The space between the housing 10 and the inner member 30 is almost completely filled with a suitable liquid 14, such as is commonly used compasses and the like. A small air bubble 15 remains to provide for thermal expansion and contraction. The member 30 is free to turn in the housing 10 to align a magnet bar 33 with the horizontal component of the earth's magnetic field.

If the housing 10 should be tipped, it is required that the inner member 30 be maintained erect in the attitude shown, and this effect is achieved by means of a body of mercury, part of which forms a pool 20 at the bottom of the cavity 11 and part of which forms a captive column 21 in a narrow tubular recess 22 formed in a downwardly projecting tubular portion 36 secured to the inner member 30. The inner diameter of the recess 22 in which the mercury column 21 is trapped is tapered down to a narrow throat 38. This narrowing tends to inhibit surging of mercury in and out of the recess 22 and hence generally to enhance the stability of the instrument. The recess 22 is closed at its upper end.

The body of mercury performs the dual function of helping support the inner member 30 buoyantly and providing a weight that will tend to cause the tubular portion 36 to be returned to the lowermost part of the housing. Moreover, the mercury, being a liquid, avoids the friction that would otherwise inevitably be encountered with solid objects, such as balls, weights or the like.

The weight of the inner member 30 will be so adjusted that, if the mercury were absent, it would have a slightly negative buoyancy, i.e. would tend to sink in the liquid 14. Thus there will be no force tending to urge its upper surface 13 against the upper portion of the inner surface 11 of the housing. However, the extra support given by the mercury pool 20 will prevent the lower end of the tubular portion 36 from engaging the bottom part of the surface 11 of the housing. The lowermost part of this tubular portion 36 includes a horizontal surface 39 to rest on the mercury pool 20.

Under shock, the mercury of the pool 20 can move freely, and some mercury may temporarily flow out of the column 21 to the pool 20 and vice versa. However, normal conditions will quickly be re-established by virtue of the differential barometric pressure created by the partial vacuum that will exist at the head of the mercury column.

Figure 2:
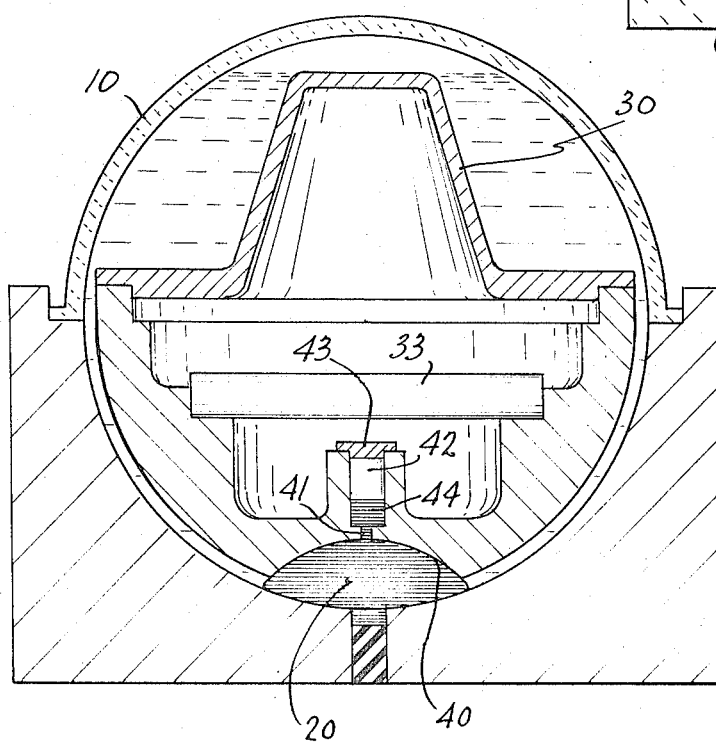
FIG. 2 is a similar view of a second embodiment.

The embodiment shown in FIG. 2 is similar, and similar parts have been given the same reference numerals. The lower portion of the inner member 30 is now of generally hemi-spherical shape to complement the lower portion of the inner surface of the spherical cavity defined by the housing 10. The shape of the recess in which the body of mercury is held captive has been changed, however. It now takes the form of two portions. The first portion is a shallow, broad-mouthed, part-spherical recess 40. At the center of such broad recess, a narrow throat 41 connects it to the second portion, an inner tubular recess portion 42, the upper end of which is closed by a stopper 43. The column of mercury 44 can enter the inner recess portion 42 in essentially the same way as the recess 22.

We claim:
1. In an indicating instrument of the type comprising
   a. a housing having an inner surface defining a spherical cavity,
   b. an indicator member located in said cavity with three mutually perpendicular axes of rotational freedom,
   c. a main liquid in said cavity surrounding and substantially supporting said indicator member, and
   d. means for maintaining said indicator member in an erect attitude in said cavity,
   the improvement wherein said maintaining means (d) comprise
   e. a recess formed in said indicator member, said recess being closed except for a downwardly opening mouth adjacent said inner housing surface,
   f. said recess including a tubular portion extending up into said indicating member, said tubular portion having a narrow throat, and
   g. a body of mercury forming a pool at the bottom of said cavity and extending into said recess including the tubular portion thereof.

2. An instrument as claimed in claim 1, including a magnet bar and at least one compass inscription mounted on said indicating member to form a magnetic compass.

3. An instrument as claimed in claim 1, wherein said indicating member has a slightly negative buoyancy in said main liquid, said pool of mercury being such as to support said member out of contact with the lower part of the inner housing surface.

4. An instrument as claimed in claim 1, wherein the mouth of the recess is broad compared to its depth.

5. A magnetic compass comprising
   a. a housing having an inner surface defining a spherical cavity,
   b. an indicator member bearing compass inscriptions located in said cavity with three mutually perpendicular axes or rotational freedom,
   c. a magnet bar mounted on said indicating member to orient the same in the horizontal component of the earth's magnetic field,
   d. a liquid in said cavity surrounding and substantially buoyantly supporting said indicating member,
   e. said indicating member including a downwardly projecting portion defining a recess closed except for a mouth opening adjacent a lower part of said inner surface, and
   f. a body of mercury forming a pool at the bottom of said cavity and in said recess to support said downwardly projecting portion out of contact with said lower part of the inner surface and to maintain said indicator member in an erect attitude in said cavity,
   g. wherein said recess includes two portions with a narrow throat between them.

6. A magnetic compass comprising
   a. a housing having an inner surface defining a spherical cavity,
   b. an indicator member bearing compass inscriptions located in said cavity with three mutually perpendicular axes of rotational freedom, said member having a lower portion of generally hemi-spherical shape complementing a lower portion of said inner housing surface,
   c. a magnet bar mounted on said indicating member to orient the same in the horizontal component of the earth's magnetic field,
   d. a liquid in said cavity surrounding and substantially buoyantly supporting said indicating member,
   e. said indicating member including a part-spherical recess having a broad mouth and being closed except for said mouth which faces downwardly and opens adjacent said lower portion of the inner housing surface,
   f. said recess including a tubular portion extending up into said indicating member, and
   g. a body of mercury forming a pool at the bottom of said cavity and extending into said recess to support said indicator member out of contact with said lower portion of the inner housing surface and to maintain said indicator member in an erect attitude in said cavity.

7. A magnetic compass according to claim 6, including a narrow throat in said recess.

* * * * *